UNITED STATES PATENT OFFICE.

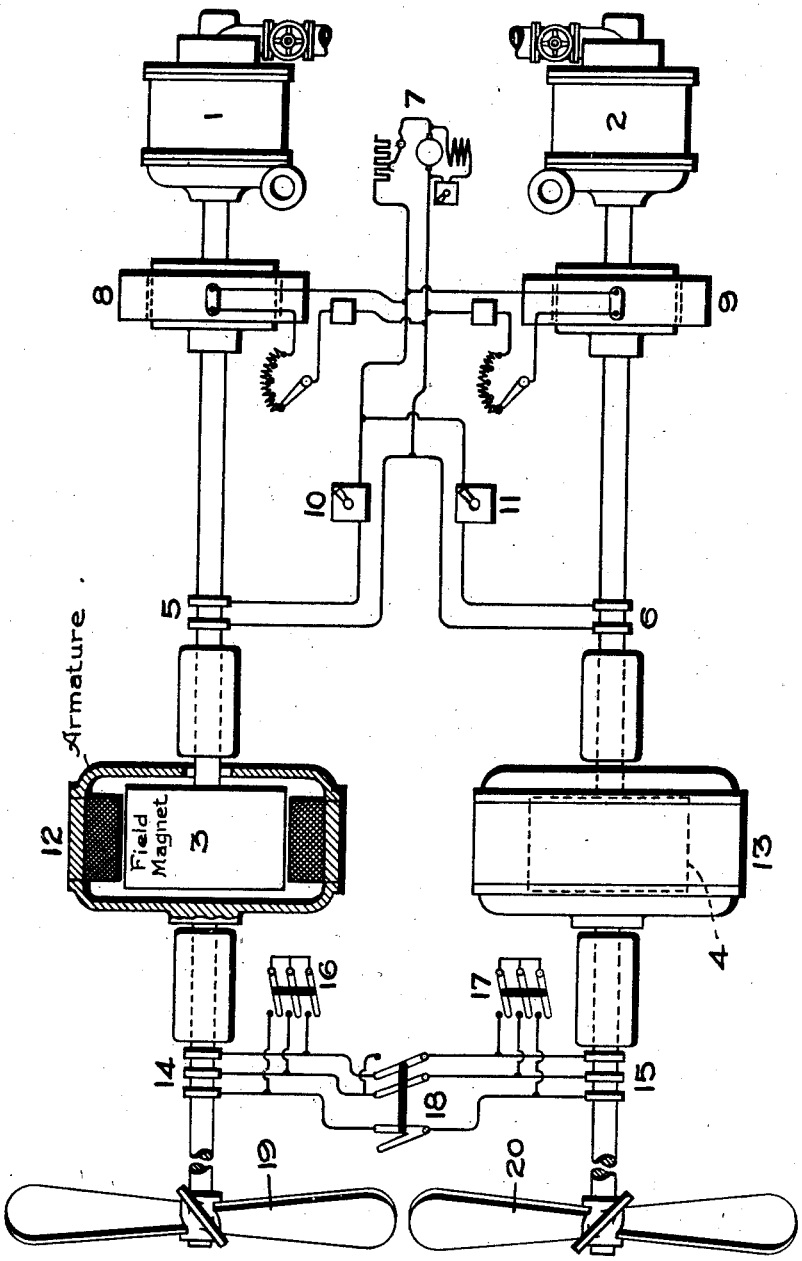

ELIHU THOMSON, OF SWAMPSCOTT, MASSACHUSETTS, ASSIGNOR TO GENERAL ELECTRIC COMPANY, A CORPORATION OF NEW YORK.

TURBO-ELECTRIC PROPULSION OF VESSELS.

1,047,858.  Specification of Letters Patent.  Patented Dec. 17, 1912.

Application filed January 16, 1911. Serial No. 602,922.

*To all whom it may concern:*

Be it known that I, ELIHU THOMSON, a citizen of the United States, residing at Swampscott, county of Essex, State of Massachusetts, have invented certain new and useful Improvements in Turbo-Electric Propulsion of Vessels, of which the following is a specification.

This invention relates to the propulsion of ships by means of electric motors supplied with current from turbo-generators.

Steam turbines, in order to develop the best efficiency, should run at high speed, and therefore they cannot be connected directly to the propelling screws of a ship. By the interposition of electric generators and motors, a satisfactory reduction in speed can be obtained, and ample opportunity is afforded for flexibility of control in speed, so that cruising, maneuvering, backing and other evolutions can be readily performed. In the present invention, however, I have departed from the customary systems of electric drive, and instead of generators and motors, I have provided a species of electric clutch for connecting the turbine shaft to the propeller shaft, said clutch permitting a slip between its revolving parts sufficient to allow the required reduction in speed of rotation between the two shafts. By using a pair of turbines, screws and clutches, and brakes, and providing suitable cross connections, I can effect a great variation in speed, for cruising and other purposes.

The accompanying drawing is a diagram of circuits, machinery and control apparatus embodying my invention.

The steam turbines 1 and 2 are of the high speed, high efficiency type, and are governed as to speed by the usual ways of controlling the steam in accordance with the variations in load. Proper throttle valves are provided for shutting down these engines, as usual. On the shaft of the turbine 1, is mounted a field magnet 3 and on the shaft of the turbine 2 the field magnet 4, each field magnet consisting of a laminated core of iron carrying a distributed winding of insulated copper wire. These windings are supplied with current through slip rings 5 and 6, from a direct current exciter 7, shown diagrammatically and having the usual regulating appliances. Concentric with the field magnet on each shaft is a laminated iron structure 12 and 13 provided with induced or armature windings of a polyphase (and preferably a three-phase) character. The terminals of these windings, as is usual with the rotating members of many electrical machines are carried to slip rings 14 and 15 on the respective shafts on which the armature structures are mounted, said shafts being alined respectively with the turbine shafts. The leads from the brushes of these slip rings run to switches 16 and 17 by means of which the windings can be short circuited when desired. Branch leads enable the two machines to be interconnected, and a switch 18 enables two of said leads to be interchanged when desired. On each of the shafts carrying the armature structures 12 and 13 is mounted a propelling screw 19 and 20. In the drawing, the blades of the two screws are shown as inclined in opposite directions, which requires that the two armatures 12 and 13 shall rotate in opposite directions for propelling the ship forward.

Means are provided for holding from rotation, when desired, the shaft of one or the other or both of said turbines. This holding device or devices may consist of a mechanical or a magnetic brake or clutch, such clutch or clutches being controllable at will to produce the desired effect. In the drawing, electro-magnetic clutches 8 and 9 are shown, taking current from the exciter 7, through suitable regulating devices whereby the current can be varied or cut off. Controlling devices 10 and 11 are shown in the circuits of the revolving field magnets 3 and 4 for varying the resistances of said circuits to control the strengths of the magnetic fields developed by the windings on said field magnets.

The operation is as follows: Owing to the magnetic drag exerted upon the armature structures by the revolving field magnets 3 and 4, the shafts carrying the propelling screws will be carried around with said field magnets, when the short-circuiting switches 16 and 17 are closed and the interconnecting switch 18 is open. Some considerable variation in the speed of the screws can be obtained by varying the strength of the field magnets so as to alter the slip between each of them and the revoluble armatures 12 and 13 respectively. Further variations can be had by controlling the speed of the turbines 1 and 2, which drive the fields 3 and 4. When, however, it is desired to effect a considerable reduction in the speed of the vessel, then one or the other of the turbines has its steam shut off, and the corresponding clutch 8, or 9, as the case may be, is set into action to hold stationary both the shaft of the turbine and the field magnet carried thereby. Under these conditions, the short-circuiting switches 16 and 17 are opened, and the switch 18 is closed, so that the three-phase current generated in the windings of the armature whose field magnet is still rotating will be delivered to the windings of the armature whose field magnet is stationary. This will cause the latter armature to rotate around its stationary field magnet, but under these conditions the speed of rotation is reduced to approximately one-half the speed developed when both turbines are in operation. This low speed is suitable for cruising or maneuvering. Upon interchanging the connections of two of the interconnecting leads, by suitably manipulating the switch 18, the direction of rotation of one of the screws will be reversed; that is, the one whose armature is receiving current from the armature of the rotating field magnet. Both screws cannot be reversed at the same time, but for the purpose of backing the ship, a small auxiliary screw, driven by a small steam engine, can be provided, or a set of reversing bucket wheels can be incorporated in the turbines 1 and 2. The various switches can be conveniently operated by a system of remote control from some central station, as will be readily understood by the skilled engineer.

In accordance with the provisions of the patent statutes, I have described the principle of operation of my invention, together with the apparatus which I now consider to represent the best embodiment thereof, but I desire to have it understood that the apparatus shown is only illustrative, and that the invention can be carried out by other means.

What I claim as new and desire to secure by Letters Patent of the United States, is,—

1. In a system of ship propulsion, the combination with a pair of turbines, of revolving field magnets each driven by its respective turbine, a revoluble armature structure concentric with each field magnet, a screw propeller having a shaft carrying its respective armature structure, means for supplying an exciting current to the windings of the field magnets, means for short circuiting the winding on each armature, conductors connecting the windings, and means for arresting the rotation of at least one of the field magnets.

2. In a system of ship propulsion, the combination with a pair of turbines, of revolving field magnets each driven by its respective turbine, a revoluble armature structure concentric with each field magnet, screw propellers each having a shaft carrying its respective armature structure, an exciter supplying current to said field magnet windings, polyphase windings on said armatures, means for interconnecting the same, and means for holding stationary either of said revolving field magnets.

3. In a system of ship propulsion, the combination with a pair of turbines, of revolving field magnets each driven by its respective turbine, an electro-magnetic clutch for holding each field magnet stationary, an exciter supplying current to said field magnets and to said clutches, revoluble armature structures concentric with each of said field magnets and having polyphase windings, means for short-circuiting said windings, and means for interconnecting them and also for interchanging phases when desired, and screw propellers having shafts carrying said armature structures.

4. In a system of ship propulsion, the combination of a plurality of prime movers, shafts driven thereby, a propeller shaft in line with each of the said shafts, a field magnet carried by one of the alined shafts, an armature carried by the other shaft, means for arresting the rotation of one shaft and the generator member carried by it, current collecting devices for the generators, and conductors connecting said devices.

In witness whereof, I have hereunto set my hand this tenth day of January, 1911.

ELIHU THOMSON.

Witnesses:
JOHN A. MCMANUS, Jr.,
CHARLES A. BARNARD.